(12) United States Patent
Yuan et al.

(10) Patent No.: US 10,880,037 B2
(45) Date of Patent: Dec. 29, 2020

(54) ERROR DETECTION USING SYMBOL DISTRIBUTION IN A SYSTEM WITH DISTRIBUTION MATCHING AND PROBABILISTIC AMPLITUDE SHAPING

(71) Applicants: HUAWEI TECHNOLOGIES DUESSELDORF GMBH, Duesseldorf (DE); TECHNISCHE UNIVERSITAET MUENCHEN, Munich (DE)

(72) Inventors: Peihong Yuan, Munich (DE); Georg Boecherer, Munich (DE); Patrick Schulte, Munich (DE); Gerhard Kramer, Munich (DE); Ronald Boehnke, Munich (DE); Wen Xu, Munich (DE)

(73) Assignees: Huawei Technologies Duesseldorf GmbH, Duesseldorf (DE); Technische Universitaet Muenchen, Munich (DE)

( * ) Notice: Subject to any disclaimer, the term of this patent is extended or adjusted under 35 U.S.C. 154(b) by 0 days.

(21) Appl. No.: 16/384,559

(22) Filed: Apr. 15, 2019

(65) Prior Publication Data
US 2019/0245651 A1     Aug. 8, 2019

Related U.S. Application Data

(63) Continuation of application No. PCT/EP2016/076239, filed on Oct. 31, 2016.

(51) Int. Cl.
*H04L 1/00* (2006.01)
*H04L 1/18* (2006.01)

(52) U.S. Cl.
CPC .......... *H04L 1/0042* (2013.01); *H04L 1/0047* (2013.01); *H04L 1/0061* (2013.01); *H04L 1/0075* (2013.01); *H04L 1/1829* (2013.01)

(58) Field of Classification Search
CPC ... H04L 1/0042; H04L 1/0047; H04L 1/0061; H04L 1/0075; H04L 1/1829
(Continued)

(56) References Cited

U.S. PATENT DOCUMENTS

| 2009/0319855 A1* | 12/2009 | Yue | H04L 1/0003 714/751 |
| 2011/0069668 A1* | 3/2011 | Chion | H04L 1/1829 370/329 |

OTHER PUBLICATIONS

Bocherer et al., "Bandwidth Efficient and Rate-Matched Low-Density Parity-Check Coded Modulation," IEEE Transactions on Communications, vol. 63, No. 12, pp. 4651-4665, Institute of Electrical and Electronics Engineers, New York, New York (Dec. 2015).
(Continued)

*Primary Examiner* — James C Kerveros
(74) *Attorney, Agent, or Firm* — Leydig, Voit & Mayer, Ltd.

(57) ABSTRACT

A signal receiver for interpreting a received signal is provided, the receiver being configured to perform: decoding the received signal so as to form a sequence of symbols hypothesised to represent the content of the received signal; comparing the frequency of occurrence of symbols within the sequence with a predetermined symbol distribution; and if the relative frequency of occurrence of symbols within the sequence of symbols does not match the predetermined distribution, treating the sequence of symbols as being an incorrect representation of the content of the received signal.

18 Claims, 3 Drawing Sheets

(58) Field of Classification Search
USPC .......................................................... 714/752
See application file for complete search history.

(56) References Cited

OTHER PUBLICATIONS

Buchali et al., "Rate Adaptation and Reach Increase by Probabilistically Shaped 64-QAM: An Experimental Demonstration," Journal of Lightwave Technology, vol. 34, No. 7, pp. 1599-1609, Institute of Electrical and Electronics Engineers, New York, New York (Apr. 1, 2016).

Chandramouli et al., "A Generalized Sequential Sign Detector for Binary Hypothesis Testing," IEEE Signal Processing Letters, vol. 5, No. 11, pp. 295-297, Institute of Electrical and Electronics Engineers, New York, New York (Nov. 1998).

Schulte et al., "Constant Composition Distribution Matching," IEEE Transactions on Information Theory, vol. 62, No. 1, pp. 430-434, Institute of Electrical and Electronics Engineers, New York, New York (Jan. 2016).

Fossorier et al., "Soft-Decision Decoding of Linear Block Codes Based on Ordered Statistics," IEEE Transactions on Information Theory, vol. 41, No. 5, pp. 1379-1396, Institute of Electrical and Electronics Engineers, New York, New York (Sep. 1995).

Seshadri et al., "List Viterbi Decoding Algorithms with Applications," IEEE Transactions on Communications, vol. 42, No. 2/3/4, pp. 313-323, Institute of Electrical and Electronics Engineers, New York, New York (1994).

Tal et al., "List Decoding of Polar Codes," IEEE Transactions on Information Theory, vol. 61, No. 5, pp. 2213-2226, Institute of Electrical and Electronics Engineers, New York, New York (May 2015).

* cited by examiner

ERROR DETECTION USING SYMBOL DISTRIBUTION IN A SYSTEM WITH DISTRIBUTION MATCHING AND PROBABILISTIC AMPLITUDE SHAPING

CROSS-REFERENCE TO RELATED APPLICATIONS

This application is a continuation of International Application No. PCT/EP2016/076239, filed on Oct. 31, 2016, the disclosure of which is hereby incorporated by reference in its entirety.

TECHNICAL FIELD

This invention relates to decoding and encoding signals in a way that makes use of a predetermined symbol distribution.

BACKGROUND

In order for a communication system to achieve the AWGN channel capacity, the transmit symbols used in the system would have to be Gaussian-distributed. That can only be approximated in practical systems. The use of uniformly distributed QAM (quadrature amplitude modulation) symbols leads to a shaping loss of up to 1.53 dB for high order constellations. Bit-interleaved coded modulation (BICM) with parallel bit-wise de-mapping and decoding, which is currently employed in most communication systems, such as DVB, LTE, WiFi, xDSL, and fibre communications, leads to an additional loss. As illustrated in FIG. 1, the total loss for uniform 64QAM may amount to more than 1 dB for spectral efficiencies between 2 and 5 bits/s/Hz. In some systems these losses can be almost fully eliminated by probabilistic shaping (PS), where the QAM symbols follow an approximate discrete Gaussian distribution.

Some systems employ shaping to influence the symbol distribution. Examples include trellis shaping, shell mapping and superposition coding. These may impact performance or may require relatively complex iterative demapping at the receiver.

A simple probabilistic amplitude shaping (PAS) scheme has been proposed recently, which can approach the channel capacity for large block lengths using standard binary channel codes with iterative decoding (for details, see, G. Bocherer, F. Steiner, and P. Schulte, "Bandwidth efficient and rate-matched low-density parity-check coded modulation," *IEEE Trans. Commun.*, vol. 63, no. 12, pp. 4651-4665, December 2015). It uses so-called constant composition distribution matching (CCDM) to approximate the optimal symbol distribution (for details, see, P. Schulte and G. Böcherer, "Constant Composition Distribution Matching," *IEEE Trans. Inf. Theory*, vol. 62, no. 1, pp. 430-434, January 2016). However, CCDM incurs a rate loss for short block lengths that could outweigh the achieved shaping gain.

Another problem for short codes is that iterative decoding does also not perform well. As alternative approaches, several list decoding algorithms have been proposed in the literature to approach the performance of the optimal maximum likelihood (ML) decoder. These algorithms usually employ an outer error detecting code such as a cyclic redundancy check (CRC), which selects a valid codeword from the generated list of candidates. CRC codes are also used for hybrid ARQ schemes to check if a message was correctly received. While the additional CRC bits may be neglected for large message lengths, the overhead and the resulting rate loss is more significant for short blocks.

There is a need to improve the efficiency of probability-shaped coding schemes, especially for short block lengths.

SUMMARY

According to one aspect there is provided a signal receiver for interpreting a received signal, the receiver being configured to perform the steps of: decoding the received signal so as to form a sequence of symbols hypothesised to represent the content of the received signal; comparing the frequency of occurrence of symbols within the sequence with a predetermined symbol distribution; and if the relative frequency of occurrence of symbols within the sequence of symbols does not match the predetermined distribution, treating the sequence of symbols as being an incorrect representation of the content of the received signal.

The sequence may be ordered in time and/or according to an index.

The receiver may be configured to request retransmission of the received signal if the relative frequency of occurrence of symbols within the sequence of symbols does not match the predetermined distribution. Thus the matching of the symbols to the distribution may be used as an error check.

The receiver may be configured to: decode the received signal so as to form a plurality of sequences of symbols hypothesised to represent the content of the received signal; compare the relative frequency of occurrence of symbols within each of those sequences with the predetermined symbol distribution; and select as a candidate representation of the received signal the or each sequence of symbols within which the average frequency of occurrence of symbols best matches the predetermined distribution. Thus the matching of the symbols to the distribution may be used to choose between candidate decodings.

The receiver may be configured to, if more than one of the sequences of symbols match the predetermined distribution, perform a maximum likelihood detection process on those sequences to select a single candidate representation of the received signal. This may be used to choose between candidate decodings.

The said decoding step may be performed by a first process and the receiver may be configured to, if the frequency of occurrence of symbols within the sequence of symbols does not match the predetermined distribution, decode the received signal by a second process different from the first process so as to form a second sequence of symbols hypothesised to represent the content of the received signal. Thus the matching of the symbols to the distribution may be used to assess whether a first process is adequate to decode the signal.

The second process may be more computationally intensive than the first process. Thus it may be preferable to omit that process if possible.

The first process may be an iterative forward error correction decoding process. Thus is may be relatively efficient.

The predetermined distribution may comprise a definition of probabilities of occurrence for each of a plurality of symbols. The frequency of occurrence of symbols within the sequence of symbols may be treated as not matching the predetermined distribution when the relative frequency of occurrence of any symbol in the sequence of symbols deviates from the defined probability of occurrence for that symbol by at least a predetermined amount. The predetermined amount may be equivalent to one symbol over the length of the signal. This has the advantage that the probability assessment can be held strictly to the expected distribution. This can be efficient if strict probability shaping has been applied at the transmitter.

The predetermined distribution may comprise a definition of probabilities of occurrence for each of a plurality of characteristics of symbols. The frequency of occurrence of symbols within the sequence of symbols may be treated as not matching the predetermined distribution when the average frequency of occurrence of symbols having any of the characteristics of symbols deviates from the defined probability of occurrence for symbols having that characteristic by a predetermined amount. Thus groups of symbols may be grouped together when assessing their probability of occurrence. There may be more than one such group.

The characteristics may be or include symbol amplitudes. The receiver may be configured to receive a signal encoded in accordance with an encoding scheme that employs probabilistic amplitude shaping. The receiver may be configured to receive a signal encoded in accordance with an encoding scheme that employs constant composition distribution matching. Such schemes may achieve relatively efficient use of bandwidth.

The receiver may be configured to decode the received signal so as to form a sequence of symbols representing the content of the received signal by performing maximum likelihood decoding on a plurality of candidate sequences of symbols in dependence on the extent to which the relative frequency of occurrence of symbols within a candidate sequence matches a predetermined symbol distribution. This may be used to choose efficiently between candidate decodings.

According to a second aspect there is provided a communications system comprising: a transmitter configured to encode a data signal to an encoded sequence of symbols according to an encoding scheme under which at least one characteristic of at least one of the symbols has to be selected with a predetermined frequency, and to transmit the encoded sequence of symbols as a transmitted signal; and a signal receiver as set out above configured to receive the transmitted signal.

The transmitter may be configured to encode the data signal to form the encoded sequence of symbols in accordance with an encoding scheme that employs probabilistic amplitude shaping. Then the receiver can assume that it can apply analysis assuming a probability-shaped signal.

The symbols in the encoded sequence may have a plurality of amplitude levels. The transmitter may be configured to encode the data signal to form the encoded sequence of symbols such that symbols having each amplitude level occur with a predetermined frequency over the encoded sequence of symbols. The transmitter may be configured to encode the data signal to form the encoded sequence of symbols such that symbols having each amplitude level occur with equal frequency over the encoded sequence of symbols. The transmitter may be configured to encode the data signal to form the symbols in accordance with an encoding scheme that employs constant composition distribution matching. These approaches can lead to efficient use of bandwidth.

According to a third aspect there is provided a method for interpreting a received signal, the method comprising: decoding the received signal so as to form a sequence of symbols hypothesised to represent the content of the received signal; comparing the frequency of occurrence of symbols within the sequence with a predetermined symbol distribution; and if the relative frequency of occurrence of symbols within the sequence of symbols does not match the predetermined distribution, treating the sequence of symbols as being an incorrect representation of the content of the received signal.

BRIEF DESCRIPTION OF DRAWINGS

The present invention will now be described by way of example with reference to the accompanying drawings. In the drawings.

DESCRIPTION OF EMBODIMENTS

Figure 1:
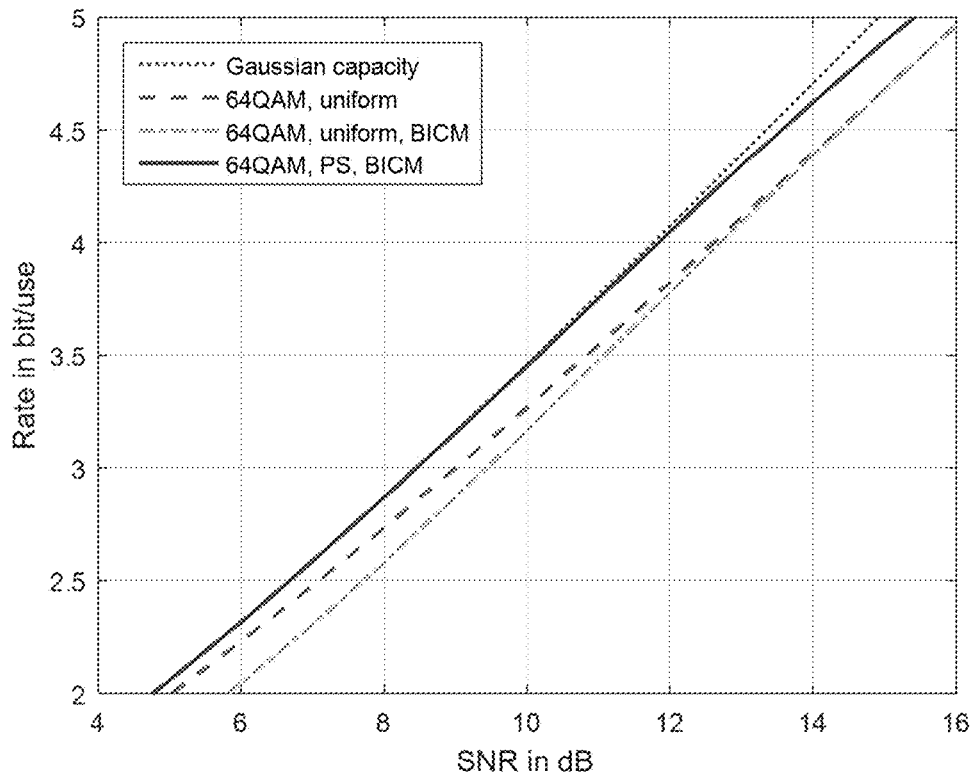
FIG. 1 shows achievable rates for an AWGN channel and 64QAM with uniform and optimized distributions, respectively.
Figure 2:
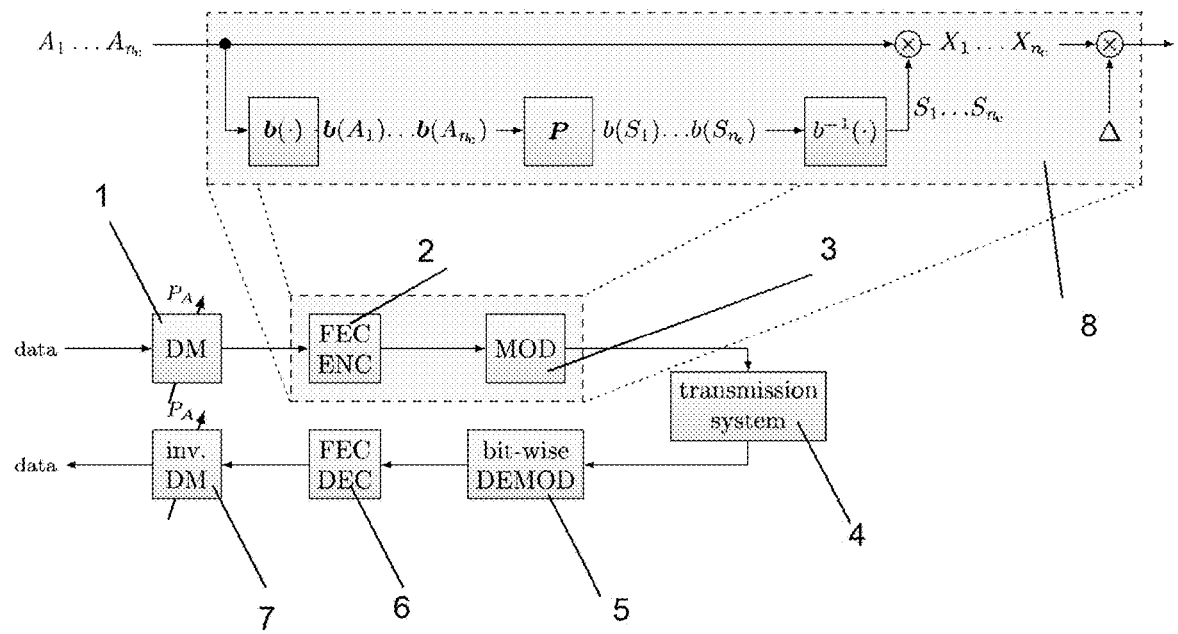
FIG. 2 shows a general model of a transmitter/receiver system using probabilistic amplitude shaping (PAS).

A basic system model for implementing the PAS encoding scheme is shown in FIG. 2.

Incoming data at 1 is mapped by a distribution matcher (DM) 1 onto a sequence of amplitudes $A_1 \ldots A_n$ with a desired distribution $P_A$. The mapping may be performed to map the symbols to the Gaussian distribution. The amplitudes are encoded in encoder 2, modulated by modulator 3 and transmitted over a channel 4. At a receiver the symbols are demodulated in demodulator 5, decoded in decoder 6 and inverse distribution matched in block 7 to yield a sequence of recovered bits.

Block 8 shows blocks 2 and 3 in more detail.

A binary label b(•) is associated with each amplitude level. These bits are encoded using a systematic channel encoder represented by P. The channel encoder generates parity bits which are almost uniformly distributed and determine the signs $S_1 \ldots S_n$ of the transmit symbols $X_1, \ldots, X_n$. The signs are multiplied by the respective amplitudes to form a transmit symbol. The transmit symbols are subsequently scaled multiplicatively by a value A to fulfil a certain transmit power constraint targeting a desired power distribution. In an alternative embodiment, the distribution matcher directly generates bit tuples $b_1 \ldots b_n$ with a desired distribution, which are then mapped together with the parity bits generated by the FEC (forward error correction) encoder onto transmit symbols using a standard QAM symbol mapper. It is also possible to replace some of the parity bits by uniformly distributed data bits in combination with a higher FEC code rate. At the receiver, bit-wise log-likelihood ratios (LLRs) are calculated based on the observed receive signal, taking the non-uniform transmit symbol distribution into account. These LLRs are fed to the FEC decoder 6. It outputs an estimate of the bit tuples $b_1 \ldots b_n$ or, equivalently, the amplitudes $A_1 \ldots A_n$, which are finally mapped back to data bits by the inverse distribution matcher 7.

Figure 3:
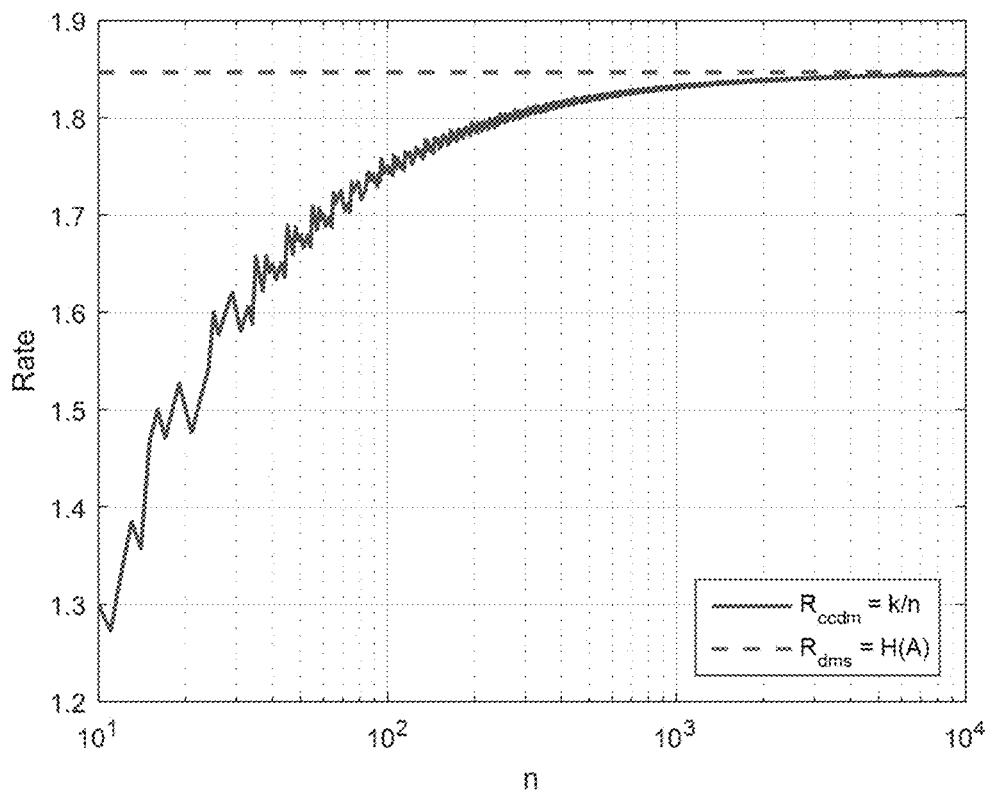
FIG. 3 shows the rate of CCDM for different block lengths n compared to the entropy of a discrete memoryless source (DMS) with the amplitude distribution $P_A=[0.4, 0.3, 0.2, 0.1]$.

Ideally, the amplitudes $A_1 \ldots A_n$ should be independent and identically distributed (IID) as if they were generated by a discrete memoryless source (DMS). This can in general only be approximately achieved in practice by the distribution matcher. Using CCDM, the desired distribution $P_A(a)$ is approximated by sequences $A_1 \ldots A_n$ of the same type that contain each amplitude level a exactly $n_a \approx n \cdot P_A(a)$ times. The number of data bits k and hence the rate of the distribution matcher $R_{ccdm}=k/n$ is upper bounded by the number of sequences with the desired type $$2^k \leq n!/n_1!n_2! \ldots n_{M/2}!$$

where M/2 denotes the number of amplitude levels for M-ASK (amplitude shift keying). As shown in FIG. 3 for an example with four amplitude levels, the rate of CCDM approaches the entropy of a DMS with the desired amplitude distribution for large block length n. For short blocks, however, CCDM leads to a rate loss. Reasons for this may include (a) that the number of sequences with the desired type is in general not a power of 2, hence only a subset of the sequences is used in order to obtain an invertible mapping between the k data bits and n amplitudes and (b) that the amplitudes are not statistically independent as all sequences $A_1 \ldots A_n$ have the same type. CCDM can be efficiently implemented by arithmetic coding without the need to store all sequences of the desired type.

In essence the distribution matcher 1 introduces additional redundancy. The reason for this is that in order that a probability shaping of an aspect of the transmitted signal (in the case the distribution of the amplitude levels) can be fixed, the system has reduced freedom over the transmitted signal.

In the systems to be described below, this additional redundancy is used by the receiver to perform error detection and/or error correction. This can improve efficiency at the receiver.

When a signal has been transmitted using CCDM, in the manner described above, a receiver can verify a candidate/hypothesised decoding of the received signal using a simple type check. The constraint applied to the transmitter means that for a given block length n and amplitude distribution $P_A(a)$ each amplitude sequence $A_1 \ldots A_n$ in a correctly decoded received signal must contain the amplitude level a exactly $n_a$ times. It follows that, at the receiver, any version of a decoded signal output by the FEC decoder that does not fulfil that condition cannot correspond to a correctly decoded signal. This principle means that error detection or improved decoding mechanisms can be employed at the receiver by counting the amplitudes in a candidate decoding and comparing them to one or more of the values $n_a$.

Thus, patterns in the transmit sequence for error detection can be exploited to allow the required overhead for dedicated error correcting codes (e.g. CRC) to be reduced.

Embodiments employing this approach may provide several advantages. Available redundancy can be exploited at the receiver to improve efficiency. This can help compensate for the rate loss resulting from the distribution matcher at the transmitter. When the signal has been encoded using CCDM, the distribution analysis can be performed very simply by counting amplitudes. The approach can be used with standard binary FEC codes and QAM symbol mappers, and can if desired be combined with an additional short outer CRC code.

By testing a hypothesised sequence of received symbols against a predetermined distribution that is known to be a property of a correct decoding of the received signal, an assessment can be made of whether the hypothesised sequence is an incorrect decoding or a plausible decoding. This decision may support any of a number of actions at the receiver. Some examples are as follows.

1. The receiver may be configured to, if a sequence of received symbols hypothesised to represent a correct decoding of a received message does not match the predetermined distribution, request retransmission of the message. This may form part of a HARQ (hybrid automatic repeat request) scheme.

2. The receiver may be configured to form multiple sequences of received symbols that could represent a correct decoding of a received message. The receiver may select one of those as being a preferred decoding based on it having the best fit of those sequences to the predetermined distribution. The candidate decodings (codewords) may be generated by a list decoding algorithm.

3. The receiver may be configured to, on receiving a message, first attempt to decode that message using a relatively low complexity and/or relatively high efficiency algorithm. This generates a candidate decoding. Then the receiver can test that decoding against the predetermined distribution. If it matches the distribution then it may be treated as a correct decoding. Otherwise, the receiver can decode the message again using a relatively high complexity and/or relatively low efficiency algorithm. The algorithms may, for example, be FEC decoding algorithms.

To employ the methods described above, the receiver needs to know the distribution applied by the transmitter. That distribution may be applied to a per-symbol accuracy, or the transmitter may permit some leeway in applying the distribution. In the latter case the receiver must also know the permissible deviation from the desired distribution. The distribution and, if appropriate, the permissible deviation can be predetermined and stored at the receiver. Alternatively, it/they can be signalled from the transmitter to the receiver, e.g. using a control channel. In the case of CCDM the parameters to be stored by and/or transmitted to the receiver may include the symbol mapping, amplitude distribution $P_A(a)$, and FEC code parameters employed at the transmitter.

Figure 4:
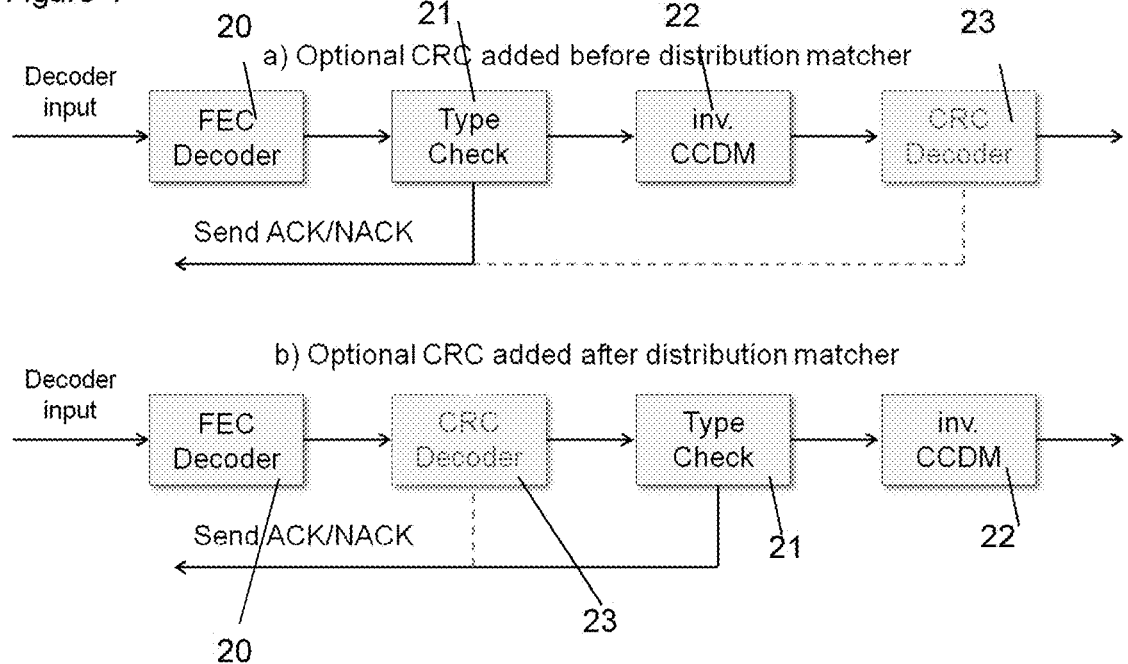
FIG. 4 shows an architecture for performing error detection for HARQ based on a type check and an additional CRC.

In one example, the receiver performs the previously described type check on the FEC decoder output to generate ACK/NACK (Acknowledged/Not Acknowledged) signals which are used for HARQ. If the sequence at the FEC decoder output does not have the correct type, a NACK message is fed back to the transmitter to request a retransmission. In order to improve the error detection performance, the scheme can be combined with an additional CRC code. Only if both (i) the type check matches the expected distribution and (ii) a CRC value computed by the receiver for the candidate received codeword matches the received CRC the decoder output is regarded as correct. In that case the candidate codeword is passed for further processing at the receiver and an ACK message may be sent. FIG. 4 shows two possible implementations of such a receiver. Example (a) is suitable for the situation where, at the transmitter, a CRC is added before the distribution matcher 1 of FIG. 2. In this example the decoder input passes to a FEC decoder 20. Then a type check is performed in block 21. Depending on the result of that type check a NACK message may be returned to the transmitter. Then in block 22 an inverse CCDM process is performed. Then the CRC is decoded in block 23. If the CRC does not match then a NACK may be returned to the transmitter. Otherwise the codeword may be passed for further processing and an ACK may be returned. Example (b) is suitable for the situation where, at the transmitter, a CRC is added after the distribution matcher 1. This example is analogous to example (a) except that the order of CRC decoding is moved to between the FEC decoding and the type check, and so the type check forms the final decision as to whether the candidate codeword is accepted.

Figure 6:
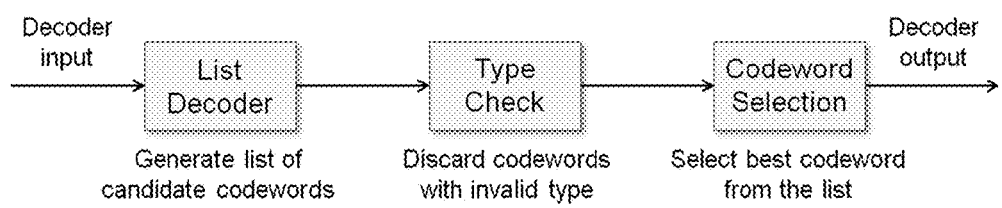
FIG. 6 shows an architecture for performing list decoding with a type check.

In a second example, the type check is combined with a list decoder as illustrated in FIG. 6. The list decoder generates a list of candidate codewords depending on the decoder input. Examples of list decoding algorithms that can be employed include:

List Viterbi algorithm (LVA) for convolutional codes (see e.g. N. Seshadri and C.-E. W. Sundberg, "List Viterbi decoding algorithms with applications," *IEEE Trans. Commun.*, vol. 42, pp. 313-323, February/March/April 1994).

Successive cancellation list (SCL) decoding for polar codes (see e.g. I. Tal and A. Vardy, "List decoding of polar codes," *IEEE Trans. Inf. Theory*, vol. 61, no. 5, pp. 2213-2226, May 2015).

Ordered statistics decoding (OSD) for binary linear block codes (see e.g. M. P. C. Fossorier and S. Lin, "Soft-decision decoding of linear block codes based on ordered statistics," *IEEE Trans. Inf. Theory*, vol. 41, pp. 1379-1396, September 1995).

The list decoding mechanism forms a list of candidate codewords. From that list, codewords that do not have the correct type (i.e. that do not match the expected distribution) can be deemed invalid. There are three possible outcomes:

No codeword has the correct type. In this case the decoder can either declare a failure (in this case, it may send a NACK message to the transmitter) or loosen the criteria for generating candidate members of the list and repeat the process with an increased list.

Exactly one codeword has the correct type. It may then be selected as the decoder output.

More than one codeword has the correct type. In this case maximum likelihood detection may be performed on the candidate codewords of the correct type. The most probable codeword can be selected from the reduced list according to the maximum likelihood (ML) criterion.

Figure 7:
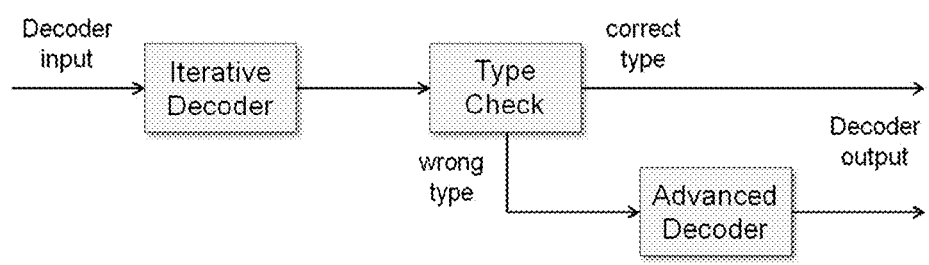
FIG. 7 shows an architecture for performing hybrid decoding with a type check.

In a third example, as shown in FIG. 7, the type check can be used to switch from a low-complexity decoding algorithm (e.g. an iterative algorithm and/or a FEC algorithm) to a more advanced decoder if an error is detected. This is particularly useful for turbo and LDPC (Low-Density Parity-Check) codes. The advanced decoder can, for example, be a list decoder with type check as described with reference to FIG. 6. The type check can also be used as an early termination criterion to stop the iterative decoder before the maximum number of iterations is reached.

Figure 5:
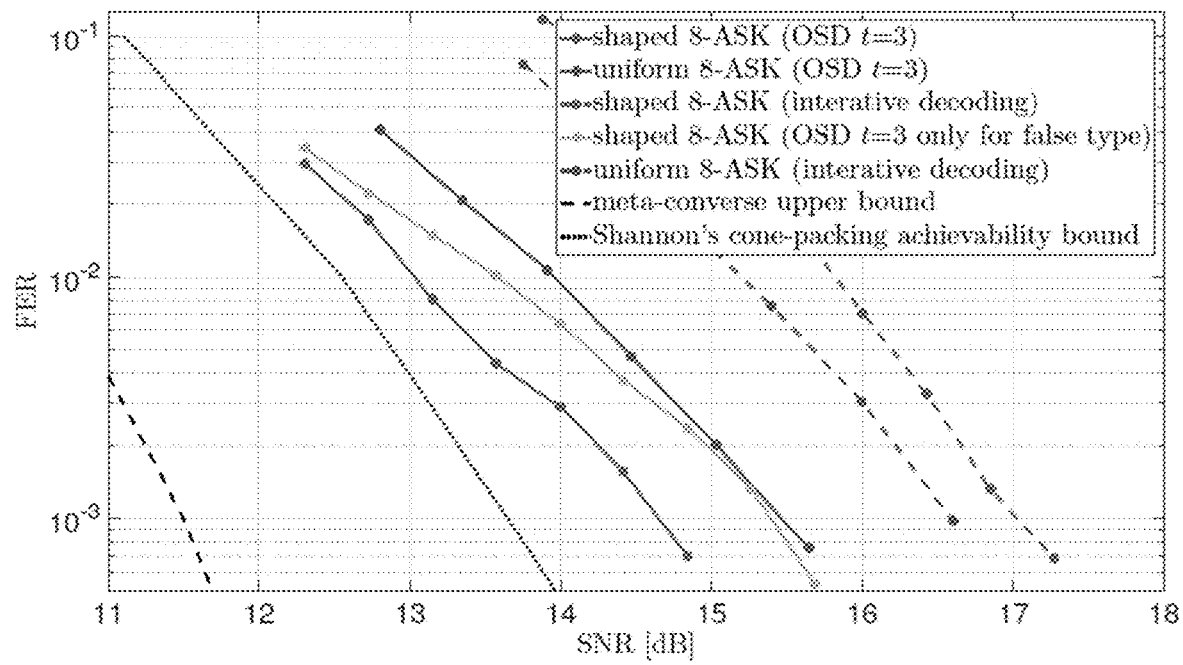
FIG. 5 shows the FER for 8-ASK, LTE Turbo code, n=20 symbols, 1.6 bit/use.

A simulated performance gain for list decoding with type check is illustrated in FIG. 5. Using standard iterative decoding without type check, shaped 8-ASK is estimated to be almost 0.5 dB worse than uniform 8-ASK without shaping due to the rate loss of CCDM. As an alternative, ordered statistics decoding (OSD) can be used to generate a list of most probable codewords (for details about OSD see e.g. M. P. C. Fossorier and S. Lin, "Soft-decision decoding of linear block codes based on ordered statistics," *IEEE Trans. Inf. Theory*, vol. 41, pp. 1379-1396, September 1995). In this case, shaping with type check at the receiver is estimated to provide a gain of approximately 1 dB compared to uniform symbols, which suggests that the rate loss of CCDM can be fully compensated if the corresponding redundancy is exploited at the receiver. The simulated performance of a hybrid FEC decoding algorithm that switches from iterative decoding to OSD if the type check is not fulfilled is also shown. It is better than uniform ASK with OSD while having a much lower average complexity.

The approach described herein is not limited to use with signals encoded using probabilistic shaping with CCDM. It can be applied to signals encoded with other schemes when the transmitter is constrained to apply a certain occurrence distribution to the symbols of the encoded and transmitted signal. The probability distribution may be applied at the symbol level (e.g. it may demand that a particular symbol is used with a certain frequency, e.g. over the length of a message) or it may be applied to groups of symbols (e.g. it may demand that a group of symbols, such as all symbols in a particular IQ quadrant, are used with a certain frequency, e.g. over the length of a message). Other distributions may invoke other patterns in the transmit signal to detect decoding errors at the receiver, e.g. known protocol headers with a certain structure. The previously-described embodiments can be adjusted accordingly by replacing or complementing the type check with other pattern checks.

The functions described above may be performed in dedicated hardware or by one or more processors executing software stored in memory at the receiver or transmitter, as appropriate.

A transmitter performing the functions described of it above may be capable of performing the functions of a receiver as described above. Thus the processes described above may be applied bidirectionally over a communication link.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A signal receiver for receiving a signal, the signal receiver comprising a processor and a non-transitory memory coupled to the processor and having processor-executable instructions stored thereon, which when executed, cause the signal receiver to perform a method, comprising:

decoding the received signal to form a sequence of symbols hypothesised to represent content of the received signal;

comparing an occurrence of symbols within the sequence with a predetermined symbol distribution;

in response to the occurrence of symbols within the sequence not matching the predetermined symbol distribution, determining that the sequence of symbols is an incorrect representation of the content of the received signal;

decoding the received signal to form a plurality of sequences of symbols hypothesised to represent the content of the received signal;

comparing an occurrence of symbols within each of the plurality of sequences with the predetermined symbol distribution; and selecting a sequence of symbols within which an average occurrence of symbols best matches the predetermined symbol distribution, which is a candidate representation of the received signal.

2. The signal receiver according to claim 1, wherein the method further comprises:
requesting retransmission of the received signal in response to the occurrence of symbols within the sequence of symbols not matching the predetermined symbol distribution.

3. The signal receiver according to claim 1, wherein the method further comprises:
in response to more than one of the sequences of symbols matching the predetermined symbol distribution, performing a maximum likelihood detection process on the sequences matching the predetermined symbol distribution, to select a single candidate representation of the received signal.

4. The signal receiver according to claim 1, wherein the decoding the received signal is performed by a first process and further comprises:
in response to the occurrence of symbols within the sequence of symbols not matching the predetermined symbol distribution, decoding the received signal by a second process different from the first process to form a second sequence of symbols hypothesised to represent the content of the received signal.

5. The signal receiver according to claim 4, wherein the second process is more computationally intensive than the first process.

6. The signal receiver according to claim 4, wherein the first process is an iterative forward error correction decoding process.

7. The signal receiver according to claim 1, wherein the predetermined symbol distribution comprises a definition of probabilities of occurrence for each of a plurality of symbols, and the occurrence of symbols within the sequence of symbols is determined to not match the predetermined symbol distribution in response to the occurrence of any symbol in the sequence of symbols deviating from a defined probability of occurrence for that symbol by at least a predetermined amount.

8. The signal receiver according to claim 7, wherein the predetermined amount is equivalent to one symbol over a length of the received signal.

9. The signal receiver according to claim 1, wherein the predetermined symbol distribution comprises a definition of probabilities of occurrence for each of a plurality of characteristics of symbols, and the occurrence of symbols within the sequence of symbols is determined to not match the predetermined distribution in response to an average occurrence of symbols having any of the characteristics in the sequence of symbols deviating from a defined probability of occurrence for symbols having that characteristic by a predetermined amount.

10. The signal receiver according to claim 9, wherein the characteristics are symbol amplitudes.

11. The signal receiver according to claim 1, wherein the method further comprises:
receiving a signal encoded in accordance with an encoding scheme that employs probabilistic amplitude shaping.

12. The signal receiver according to claim 1, wherein the method further comprises:
receiving a signal encoded in accordance with an encoding scheme that employs constant composition distribution matching.

13. A communications system comprising:
a transmitter configured to encode a data signal to an encoded sequence of symbols according to an encoding scheme under which at least one of the symbols has to be selected with a predetermined frequency, and to transmit the encoded sequence of symbols; and
a signal receiver configured to:
receive the data signal that is encoded to the encoded sequence of symbols and transmitted by the transmitter;
decode the received data signal to form a sequence of symbols hypothesised to represent content of the received data signal;
comparing an occurrence of symbols within the sequence with a predetermined symbol distribution;
in response to the occurrence of symbols within the sequence not matching the predetermined symbol distribution, determining that the sequence of symbols is an incorrect representation of the content of the received data signal;
decoding the received data signal to form a plurality of sequences of symbols hypothesised to represent the content of the received data signal;
comparing an occurrence of symbols within each of the plurality of sequences with the predetermined symbol distribution; and
selecting a sequence of symbols within which an average occurrence of symbols best matches the predetermined symbol distribution, which is a candidate representation of the received data signal.

14. The communications system according to claim 13, wherein the transmitter is configured to encode the data signal to form the encoded sequence of symbols in accordance with an encoding scheme that employs probabilistic amplitude shaping.

15. The communications system according to claim 13, wherein the symbols have a plurality of amplitude levels, and the transmitter is configured to encode the data signal to form the encoded sequence of symbols such that symbols having each amplitude level occur with a predetermined frequency over the encoded sequence of symbols.

16. The communications system according to claim 13, wherein the symbols have a plurality of amplitude levels, and the transmitter is configured to encode the data signal to form the encoded sequence of symbols such that symbols having each amplitude level occur with an equal frequency over the encoded sequence of symbols.

17. The communications system according to claim 13, wherein the transmitter is configured to encode the data signal to form the symbols in accordance with an encoding scheme that employs constant composition distribution matching.

18. A method for receiving a signal, the method comprising:
decoding, by a signal receiver, the signal to form a sequence of symbols hypothesised to represent content of the signal;
comparing, by the signal receiver, an occurrence of symbols within the sequence with a predetermined symbol distribution;
in response to a relative occurrence of symbols within the sequence of symbols docs not matching the predetermined symbol distribution, determining, by the receiver, that the sequence of symbols is an incorrect representation of the content of the received signal;

decoding, by the receiver, the received signal to form a plurality of sequences of symbols hypothesised to represent the content of the received signal;

comparing, by the receiver, an occurrence of symbols within each of the plurality of sequences with the predetermined symbol distribution; and selecting, by the receiver, a sequence of symbols within which an average occurrence of symbols best matches the predetermined symbol distribution, which is a candidate representation of the received signal.

* * * * *

UNITED STATES PATENT AND TRADEMARK OFFICE
CERTIFICATE OF CORRECTION

PATENT NO. : 10,880,037 B2
APPLICATION NO. : 16/384559
DATED : December 29, 2020
INVENTOR(S) : Yuan et al.

Page 1 of 1

It is certified that error appears in the above-identified patent and that said Letters Patent is hereby corrected as shown below:

In the Claims

Claim 18: Column 10, Line 57: "decoding, by a signal receiver, the signal to form a" should read
-- decoding, by a signal receiver, the received signal to form a --.

Claim 18: Column 10, Line 59: "of the signal;" should read -- of the received signal; --.

Claim 18: Column 10, Line 64: "sequence of symbols docs not matching the predeter-" should read
-- sequence of symbols not matching the predeter- --.

Signed and Sealed this
Fifth Day of April, 2022

Drew Hirshfeld
*Performing the Functions and Duties of the
Under Secretary of Commerce for Intellectual Property and
Director of the United States Patent and Trademark Office*